Dec. 8, 1925.  
L. R. FOREMAN  
RAILWAY VEHICLE  
Filed June 19, 1924

1,565,079

Inventor  
Lemuel R. Foreman

By

Attorney

Patented Dec. 8, 1925.

1,565,079

UNITED STATES PATENT OFFICE.

LEMUEL ROSCOE FOREMAN, OF ELIZABETH CITY, NORTH CAROLINA.

RAILWAY VEHICLE.

Application filed June 19, 1924. Serial No. 721,133.

*To all whom it may concern:*

Be it known that I, LEMUEL R. FOREMAN, a citizen of the United States, residing at Elizabeth City, in the county of Pasquotank and State of North Carolina, have invented certain new and useful Improvements in Railway Vehicles, of which the following is a specification.

My said invention relates to a traction apparatus for use on railways designed for industrial uses, such, for example, as lumbering operations, in lumber yards, etc. and it is an object of the same to provide a device of this character which shall have approximately equal forward and reverse speeds.

It is well known that in mining and lumbering operations, and on industrial railways generally, the use of ordinary locomotives or other spark producing devices is highly undesirable because of the danger of fire. My device does away with any danger of fire from this source and provides a powerful motor which is quickly and easily controlled and well adapted for working on such railroads as are laid in lumber yards, through the woods, and among buildings, these railroads being often very crooked and uneven.

Figure 1:
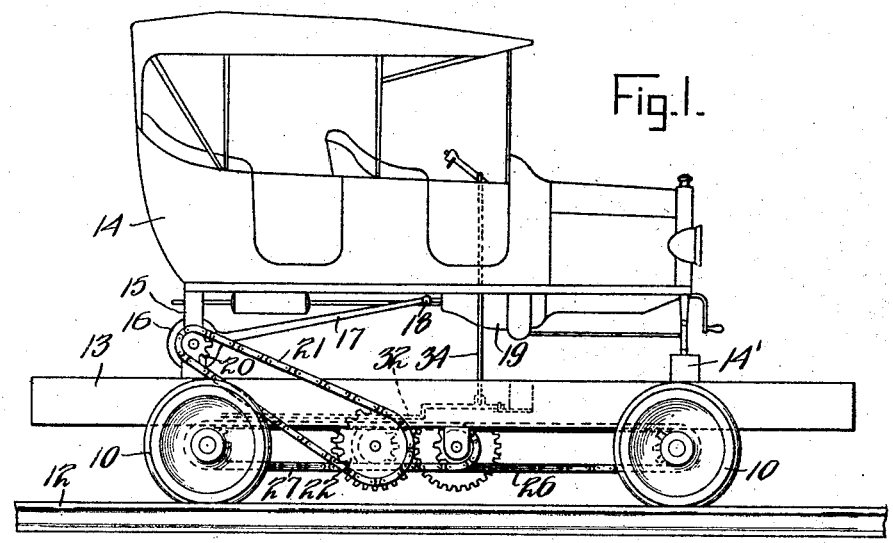
Figure 2:
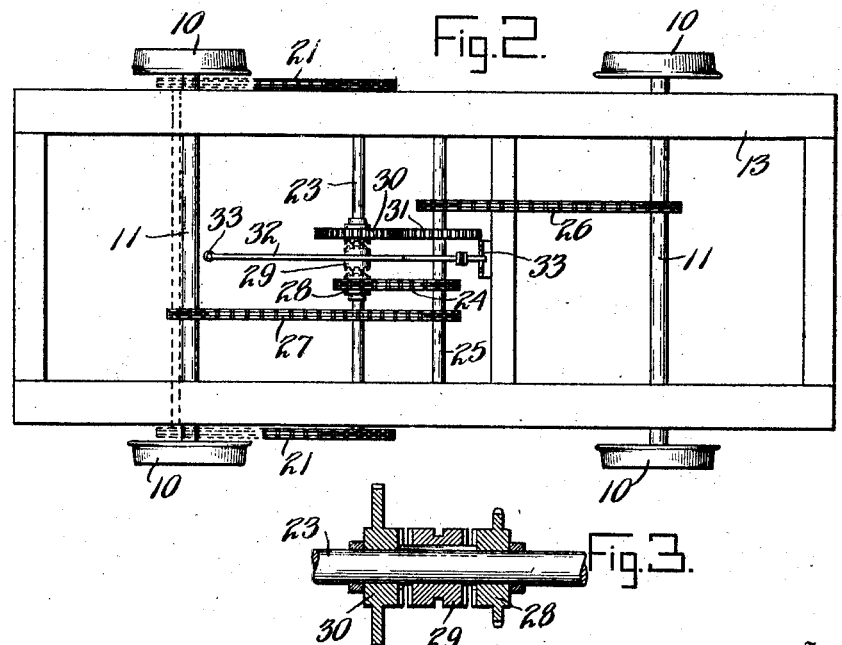
Figure 3:
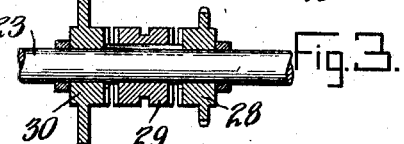

Referring to the accompanying drawings which are made a part hereof and on which similar reference characters indicate similar parts, Figure 1 is a side elevation of my device in a preferred embodiment thereof, Figure 2, a plan with the body removed, and Figure 3, a section of a reversing gear employed therein.

In the drawings reference character 10 indicates wheels which are provided in two sets each consisting of two wheels mounted on an axle 11. These wheels run on tracks 12. The axles are mounted on a framework 13 which also supports the operating gearing and the body 14, the latter consisting of an ordinary automobile body dismounted from the running gear and being shown in this instance as a Ford automobile body. This body is supported on the frame 13 by means of a cross piece 14' at the forward end and any convenient support 15 at the rear end. These supports may take any form desired so long as they are strong and rigid. The rearmost support 15 has mounted thereon a differential 16 operated by a shaft 17 connected by a universal joint 18 to the internal combustion engine 19 of ordinary form. The differential gearing, by means of pinions 20, drives a pair of chains 21 running over sprocket gears 22 on a shaft 23. This shaft is connected by sprocket gearing 24 to a shaft 25 which drives the front and rear axles 11 by means of sets of sprocket gearing indicated respectively at 26 and 27.

The sprocket gearing 24 includes a sprocket 28 on the shaft 23 having clutch teeth at its inner side said sprocket being loose on the shaft. A clutch sleeve 29 having teeth at each end is adapted to engage with the teeth of sprocket 28 at one end of its movement. At the other end of its movement it engages clutch teeth on a gear 30 meshing with a gear 31 on shaft 25. It will be evident that the gearing 30, 31 will drive the shaft in the reverse direction from that in which it is driven by the sprocket gearing 24 and at equal speed because of the respective size and arrangement of the parts.

The sleeve 29 is shifted by means of a rod 32 pivoted at 33 on the frame and engaging at its forward end with notches in the upturned rear end of a plate 33 which may be made of stamped metal or the like. Near its forward end the bar 32 has pivotally connected thereto an upright rod 34 which extends up into the body of the vehicle through a ball and socket joint in the floor thereof. It will be seen that by elevating the rod and then shifting it to one side or the other the bar 32 may be shifted to one or another of the notches in the plate 33 so as to engage the teeth on sleeve 29 with those of either one of gears 28 and 30 or to place it in neutral intermediate position.

It will be obvious to those skilled in the art that I may make various changes in my device without departing from the spirit of the invention and therefore I do not limit myself to what is shown in the drawings and described in the specification but only as indicated in the appended claims.

Having thus fully described my said invention, what I claim as new and desire to secure by Letters Patent is:

1. In a railway vehicle, an automobile body, a wheeled frame supporting the body, gearing connecting the engine to the frame including parallel driving and driven shafts, sprocket gearing connecting said shafts, intermeshing spur gears on said shafts, a clutch sleeve on the driving shaft engageable either with the sprocket gearing or with one of said spur gears, and a lever projecting through the floor of the automobile body for controlling the position of said clutch sleeve, substantially as set forth.

2. In a tractor, an automobile body, a wheeled frame having front and rear axles supporting the body, parallel shafts on the wheeled frame midway of the length of said body, sprocket gearing connecting one of said shafts to the rear axle of said automobile body, independent sprocket chains connecting the other one of said parallel shafts to the front and rear axles of said frame, and connections between said shafts whereby the tractor may be driven forward or rearward at equal speed, substantially as set forth.

3. In a railway vehicle, an automobile body, a support therefor comprising a wheeled frame, and driving gearing for the wheels of the frame including a shaft on the wheeled frame beneath the body and having driving connection with the driving mechanism on said body, a reversing clutch on the shaft, and a clutch-actuator extending through the floor of the body, substantially as set forth.

4. A railway vehicle comprising a wheeled frame having reversing gearing adapted for connection with the driving mechanism associated with an automobile adapted to be mounted thereon, substantially as set forth.

5. A railway vehicle comprising a wheeled carrier, an automobile supported on said wheeled carrier and having the wheels removed from the rear axle and such axle connected with a reversing mechanism on the wheeled carrier, substantially as set forth.

In witness whereof, I have hereunto set my hand and seal at Washington, District of Columbia, this 16th day of June, A. D. nineteen hundred and twenty-four.

LEMUEL ROSCOE FOREMAN. [L. S.]